United States Patent [19]
Häfner

[11] Patent Number: 4,750,577
[45] Date of Patent: Jun. 14, 1988

[54] WEIGHING APPARATUS

[75] Inventor: Hans W. Häfner, Aichach, Fed. Rep. of Germany

[73] Assignee: Pfister GmbH, Augsburg, Fed. Rep. of Germany

[21] Appl. No.: 893,932

[22] Filed: Aug. 6, 1986

[30] Foreign Application Priority Data

Aug. 9, 1985 [DE] Fed. Rep. of Germany ....... 3528726

[51] Int. Cl.⁴ ............................................ G01G 19/02
[52] U.S. Cl. .................................................... 177/135
[58] Field of Search ........................ 177/133, 134, 135

[56] References Cited

U.S. PATENT DOCUMENTS 3,266,584 8/1966 Lee ........................................ 177/134
3,933,212 1/1976 Bradley et al. .................. 177/133 X
4,569,407 2/1986 Gray et al. ...................... 177/133 X

FOREIGN PATENT DOCUMENTS 446122 1/1936 United Kingdom ................ 177/135
2042742 9/1980 United Kingdom ................ 177/134

Primary Examiner—George H. Miller, Jr.
Attorney, Agent, or Firm—Lowe, Price, LeBlanc, Becker & Shur

[57] ABSTRACT

A weighing apparatus for weighing large masses irregularly distributed over a predetermined area, particularly road vehicles, has a transportable frame, a platform arranged in the frame and force measuring elements supporting the platform within the frame. There is further provided a web-like sealing material covering the gap formed between the frame and the platform exclude ambient dirt from the inside portions of the apparatus.

22 Claims, 1 Drawing Sheet

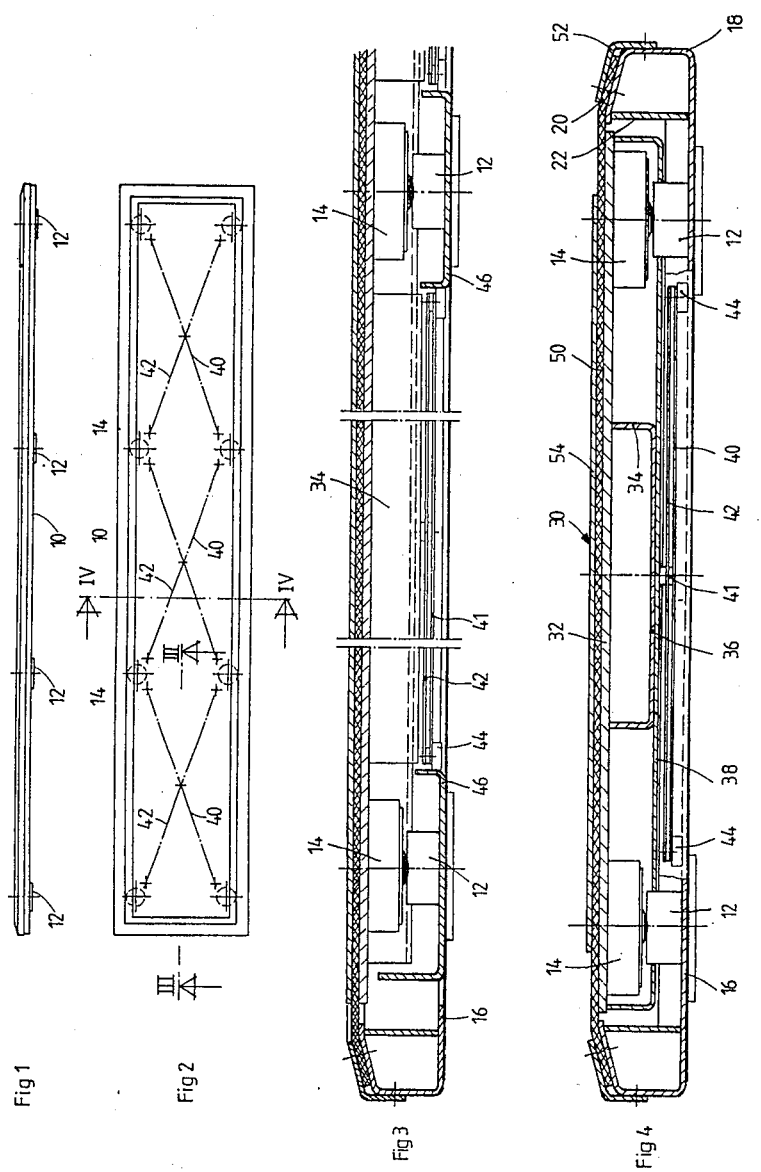

WEIGHING APPARATUS

FIELD OF THE INVENTION

The invention relates to a weighing apparatus and in particular to a weighing apparatus adapted for weighing vehicles such as trucks.

BACKGROUND OF THE INVENTION

Weighing apparatuses for weighing vehicles driven on streets, in principle, comprise a relatively large rigid plate preferably made of concrete, which plate is inserted into a base made of concrete such that the upper surface of the plate is aligned with the ground, i.e. the street. The plate acts via a linkage arrangement on a plurality of force-measuring devices arranged below the plate. Such weighing apparatuses are of complex design and are expensive to install.

Furthermore, the weighing or mass determination often must take place during loading of the trucks within short periods, at silos or the like. For such applications it is unjustified to construct the usual type of weighing apparatus for trucks or the like. This means that such a truck has to go to a weighing station before and after loading in order to determine the weight of material carried thereon.

SUMMARY OF THE INVENTION

It is an object of the present invention to provide a weighing apparatus for road vehicles which is easily transportable.

It is another object of the present invention to provide a weighing apparatus for road vehicles which is of low weight and relatively small size.

It is a further object of the present invention to provide a weighing apparatus for road vehicles which is adapted to be installed and removed in a short time.

It is a still further object of the present invention to provide a weighing apparatus for road vehicles which is highly accurate despite inexpensive construction and installment.

It is a still further object of the present invention to provide a weighing apparatus for weighing large masses which is easily transportable.

These and other objects are achieved by a weighing apparatus for large masses irregularly distributed over a predetermined area, particularly road vehicles, the apparatus comprising a transportable frame means, to support mass thereon a platform means movably arranged within the frame means, to support mass thereon the platform means being reinforced at a bottom side in longitudinal extension of the weighing apparatus, a plurality of pairs of force measuring elements and support elements arranged on top of each other in spaced relationship to each other between the platform means and the frame means, and a flexible sealing means extending between the frame means and the platform means and secured at least to the frame means.

The weighing apparatus according to the invention is a type of a measuring carpet, having the form of a self-contained platform scale hermetically closed at all sides. Using a plurality of inexpensive force measuring devices, in particular, elastostatic force measuring devices, the platform may be made very slim and yet have high rigidity between the force measuring devices.

On the other hand, due to the relatively low overall rigidity over the total length thereof, it rests on the ground, in particular the road, at all load points below the measuring devices. No extra basement is necessary since the apparatus may be inserted in an existing flat concrete basement or is just placed onto the road where it may be fixed by means of dowels or the like in order to prevent displacement thereof relative to the road. Smooth ramps which may be easily formed of concrete may facilitate the placing of the vehicle onto the weighing apparatus. The apparatus may be provided with eyelets or the like for easy transport. Thus, the apparatus may be carried by a forklift truck. The platform of the apparatus is flexible at the load points but rigid between the latter because of the double frame profile. Thus, it is possible to have a tight sealing between the base frame by means of a rubber belt, for example of the type commonly used as a conveyor belt. Two double cross links transmit horizontal forces from the platform to the base frame. The weighing apparatus according to the invention is not only adapted for road vehicles but also for weighing relatively large masses which are irregularly distributed over a large area.

BRIEF DESCRIPTION OF THE DRAWINGS

FIG. 1 is an elevational view of one embodiment of the weighing apparatus according to the invention;

FIG. 2 is a schematic plan view onto the apparatus according to FIG. 1;

FIG. 3 is an elevational sectional view of part of the apparatus according to FIG. 1 in more detail along the line III—III in FIG. 2; and FIG. 4 is a sectional view of the apparatus according to FIG. 1 along the line IV—IV in FIG. 2.

DESCRIPTION OF A PREFERRED EMBODIMENT OF THE INVENTION

An embodiment of the weighing apparatus according to the invention is shown in FIGS. 1-4 which may be used for either the left or right wheels of a truck, which means that for weighing the entire vehicle two such apparatuses are spaced and arranged in parallel to each other on the ground.

FIG. 1 shows a very slim and flat base frame 10, having support elements 12 supporting force measuring cells 14 (see FIGS. 2 to 4).

As shown in FIG. 2, the width of the base frame 10 is selected such that there is sufficient space for the twin wheels of a truck.

According to FIGS. 3 and 4, the base frame 10 comprises a flat frame 16 made of strong metallic sheet material, which frame forms an U-profie opening inwards at all four sides. Thus, the base frame 10 has side walls 18 and a top rim 20 which extends preferably upwards and inwards. For increasing the rigidity of the frame, the rim 20 is supported at its inner end by vertical struts or a wall 22 against frame 16.

A platform 30 of the weighing apparatus includes a generally strong platform plate 32 extending over the total entire apparatus within the base frame 10, however, without any contact therewith. The rigidity of the platform plate results from the provision of two frame profiles consisting of a U-profile 34 extending in longitudinal direction the ends of the legs of which engage the bottom surface of the platform plate 32, whilst a base part 36 of the U-profile rests on the top surface of a second U-profile 38 which is considerably wider than the U-profile 34 and the ends of the legs of which engage the bottom surface of the platform plate particularly at the margin thereof. The ends of the legs of the two U-profiles are bonded, preferably by welding to the bottom surface of the platform plate 32.

It should be noted that the second U-profile 38 is provided only in regions between the force measuring cells 14, as may be seen from FIG. 3. Thus, between the support elements 12 the platform is rigid against bending whilst it remains elastic for bending in the regions of the support elements 12.

The force measuring cells 14 are provided opposite to the support elements 12 at the bottom side of the platform plate 32 and there is only point contact between the force measuring cells 14 and the corresponding support elements 12. The lateral distance between the force measuring cells 14 and the support elements 12 depends on the range of the masses to be determined and the bending rigidity of the two profile frames 34 and 38 between the force measuring cells 14.

Very flat force measuring cells are used for the apparatus of the invention, preferably such as those disclosed in German Patent Application Publication No. DE-OS 33 44 901. In connection with the design described earlier these force measuring cells result in an extremely flat design of the inventive apparatus, with an overall height in the order of 100 mm. The force measuring cells 14 and the support elements 12 are arranged in longitudinal direction at both sides of the platform plate 32 adjacent to its margins. If desired, more than two force measuring cells 14 may be provided in the lateral direction.

As shown in FIGS. 2 to 4, for receiving and compensating horizontal forces, the bottom side of the U-profile 38 has secured thereto by a central stud 41 (FIG. 4) two crossing band links 40, 42 which are pivotably located around the central stud 41 and engage, by means of rolls 44 at their ends, lateral U-profiles 46 arranged in the region of the support elements 12 (FIG. 3).

A further essential feature of the apparatus according to the invention is a mat 50, made of rubber or suitable synthetic material of the type commonly used for conveyor belts. The mat 50 covers the platform plate 32 and the upper rim 20 of the base frame 10. The mat 50 is clamped to the upper rim 20 by means of an angular profile bar 52 fixed to the base frame on all sides.

This results in hermetic sealing of the interior of the apparatus. The gap between the platform and the base necessary with known platform scales permits penetration of air and dirt, which affects the elements arranged below the platform. A top-plate 54 made of strong metal sheet material, and typically consisting of several sections, is mounted on the mat 50 and is preferably vulcanized thereto or fixed to the platform plate 32 with the mat 50 inbetween by screws. Hence, curling, distortion or wear of mat 50 due to the rolling and braking of a vehicle is prevented. Alternatively, curling may be prevented by vulcanizing the top-plate 54 or its sections, respectively, into the mat 50. Also, the platform plate 32 may be vulcanized into the mat 50 or the mat 50 may be vulcanized onto the platform plate 32 strongly adhering thereto.

The bottom side of the apparatus preferably may be hermetically closed by a relatively thin sheet material, thus avoiding penetration of humidity and dirt into the apparatus.

It should be noted, that any suitable force measuring cells 14 may be used and that a complement any arrangement may be designed, i.e., the positions of the force measuring cells 14 and the support elements 12 may be exchanged.

By means of eyelets or similar means (not shown) the apparatus may be transported by a fork-lift truck.

In practice, the apparatus will be placed on solid ground usually available, exemplary e.g. a drive lane or a concrete plane, and may be fixed thereto by dowels. In the moving direction of the vehicles, the apparatus will be provided at the front and rear side with smoothly inclined ramps. Two apparatuses are arranged in spaced and parallel relationship to each other. A road vehicle moved on the two apparatuses will cause a reaction of the force measuring cells in accordance with the forces exerted on them. The signals generated by the force measuring cells are then used in a well-known manner for determining the overall weight of the vehicle.

Whilst the preferred embodiment uses a mat 50 for covering the overall arrangement, as a modification the mat 50 could be replaced by a strip-like member just covering the outer regions of the arrangement and leaving free a central part of the bottom surface.

I claim:

1. A weighing apparatus for weighing large masses irregularly distributed over a predetermined area, particularly road vehicles, comprising:
   transportable frame means;
   platform means movably arranged within the frame means for supporting a mass thereon, the platform means being reinforced at a bottom side in longitudinal extension of the weighing apparatus;
   a plurality of pairs of force measuring elements and support elements arranged on top of each other in spaced relationship to each other between the platform means and the frame means; and
   flexible sealing means extending between the frame means and the platform means and secured at least to the frame means for sealing out ambient dirt.

2. The weighing apparatus of claim 1 wherein said flexible sealing means is a mat covering the platform means and is peripherally secured to the frame means on all sides.

3. The weighing apparatus of claim 2 wherein the mat is provided with plate elements strongly adhering thereto.

4. The weighing apparatus of claim 2 wherein at least one plate element is embedded in the mat.

5. The weighing apparatus of claim 1 wherein the platform means is provided in its central longitudinal region with a first reinforcing profile.

6. The weighing apparatus of claim 5 wherein there is provided a second reinforcing profile, extending essentially over the total width of the platform means with the exception of regions adjacent to the pairs of force measuring elements and support elements, and being secured to the bottom side of the platform means.

7. The weighing apparatus of claim 1 wherein the frame means is provided with lateral profile means bearing the support elements.

8. The weighing apparatus of claim 7 wherein several pairs of force measuring elements and support elements are transversely arranged.

9. The weighing apparatus of claim 8 wherein a plurality of pairs each formed of a force measuring element and support element are transversely arranged in a longitudinal peripheral regions of the platform means.

10. The weighing apparatus of claim 1 wherein said flexible sealing means is clamped all around the frame means on top thereof by securing means.

11. The weighing apparatus of claim 1 wherein the platform means is embedded in the flexible sealing means.

12. The weighing apparatus of claim 1 wherein the flexible sealing means is secured to the frame means by screws.

13. The weighing apparatus of claim 1 wherein the flexible sealing means is secured to the frame means by bonding.

14. The weighing apparatus of claim 1 wherein at central positions between the pairs of force measuring elements and support elements at the bottom side of the frame means, crossing linkage means are secured at their centers and linkage means having ends supporting on the frame means at positions adjacent to the pairs of force measuring elements and support elements.

15. The weighing apparatus of claim 1 wherein the frame means are provided with transport eyelets.

16. The weighing apparatus of claim 1 wherein the total height is in the range between 50 and 200 mm.

17. A weighing apparatus for weighing large masses irregularrly distributed over a predetermined area, particularly road vehicles, comprising:
   transportable frame means comprising a U-profile all around the periphery, the U-profile opening inwards;
   platform means movably arranged within the frame means;
   a plurality of pairs of force measuring elements and support elements arranged on top of each other in spaced relationship to each other between the platform means and the frame means; and
   a flexible sealing means extending between the frame means and the platform means and secured at least to the frame means for sealing out ambient dirt.

18. A weighing apparatus of claim 17 wherein the U-profile is supported at ends of its legs by a transverse support means.

19. The weighing apparatus of claim 17 wherein the U-profile includes an upper leg directed inwards and upwards.

20. A weighing apparatus for weighing large masses irregularly distributed over a predetermined area, particularly road vehicles, comprising:
   a base means having a central recess;
   a platform means for supporting a mass to be weighed, arranged within the recess of the base means;
   force measuring elements supporting the platform means in said recess of the base means; and
   a flexible sealing means for sealing out dirt, extending over a gap peripherally formed between the platform means and the base means, the sealing means comprising rubber,
   said platform means being embedded in said sealing means and said sealing means being bonded to said base means, said apparatus having a height of 80 to 150 mm.

21. The weighing apparatus for weighing large masses irregularly distributed over a predetermined area, particularly road vehicles, comprising:
   a base means having a central recess;
   a platform means including at least one plate member for supporting a mass to be weighted, arranged within the recess of the base means;
   force measuring elements supporting the platform means in said recess of the base means; and
   a flexible sealing means for sealing out dirt, extending over a gap peripherally formed between the platform means and the base means, the sealing means comprising a synthetic material, said plate member being embedded in said sealing means.

22. The weighing apparatus of claim 21 wherein the flexible sealing means is secured to the frame means by bonding.

* * * * *